United States Patent [19]
Young et al.

[11] Patent Number: 5,265,225
[45] Date of Patent: Nov. 23, 1993

[54] DIGITAL SIGNAL PROCESSING ADDRESS SEQUENCER

[75] Inventors: William R. Young; David H. Damerow, both of Palm Bay, Fla.

[73] Assignee: Harris Corporation, Melbourne, Fla.

[21] Appl. No.: 482,803

[22] Filed: Feb. 21, 1990

[51] Int. Cl.[5] .................................................. G06F 12/06
[52] U.S. Cl. ............................ 395/400; 364/DIG. 1; 364/251; 364/255.1; 364/254.8; 364/254; 364/258; 364/258.1; 364/262
[58] Field of Search ................................ 395/400, 775

[56] References Cited

U.S. PATENT DOCUMENTS

| | | | |
|---|---|---|---|
| 3,883,853 | 5/1975 | O'Brian et al. | 395/400 |
| 4,306,287 | 12/1981 | Huang | 395/400 |
| 4,320,466 | 3/1982 | Myers | 395/775 |
| 4,370,732 | 1/1983 | Kogge | 395/400 |
| 4,704,680 | 11/1987 | Saxe | 395/400 |
| 4,809,156 | 2/1989 | Taber | 395/400 |
| 4,920,480 | 4/1990 | Murakami et al. | 395/800 |

OTHER PUBLICATIONS

Plessey Semiconductors, Apr. 1986, POSP1640 p. 1-32.

Primary Examiner—Rebecca L. Rudolph
Attorney, Agent, or Firm—Barnes & Thornburg

[57] ABSTRACT

A sequencer including input structure for receiving and retaining sequential data which includes the sequence starting address, the number of blocks in the sequence, the number of words in a block, increment between blocks and increment between words, includes an adder connected between the input structure and an output device and includes a controller for selectively providing to the adders inputs one or more of the sequence starting address, increment between words, increment between blocks and the output of the output device as a function of the number of blocks in the sequence and the number of words in a block.

26 Claims, 1 Drawing Sheet

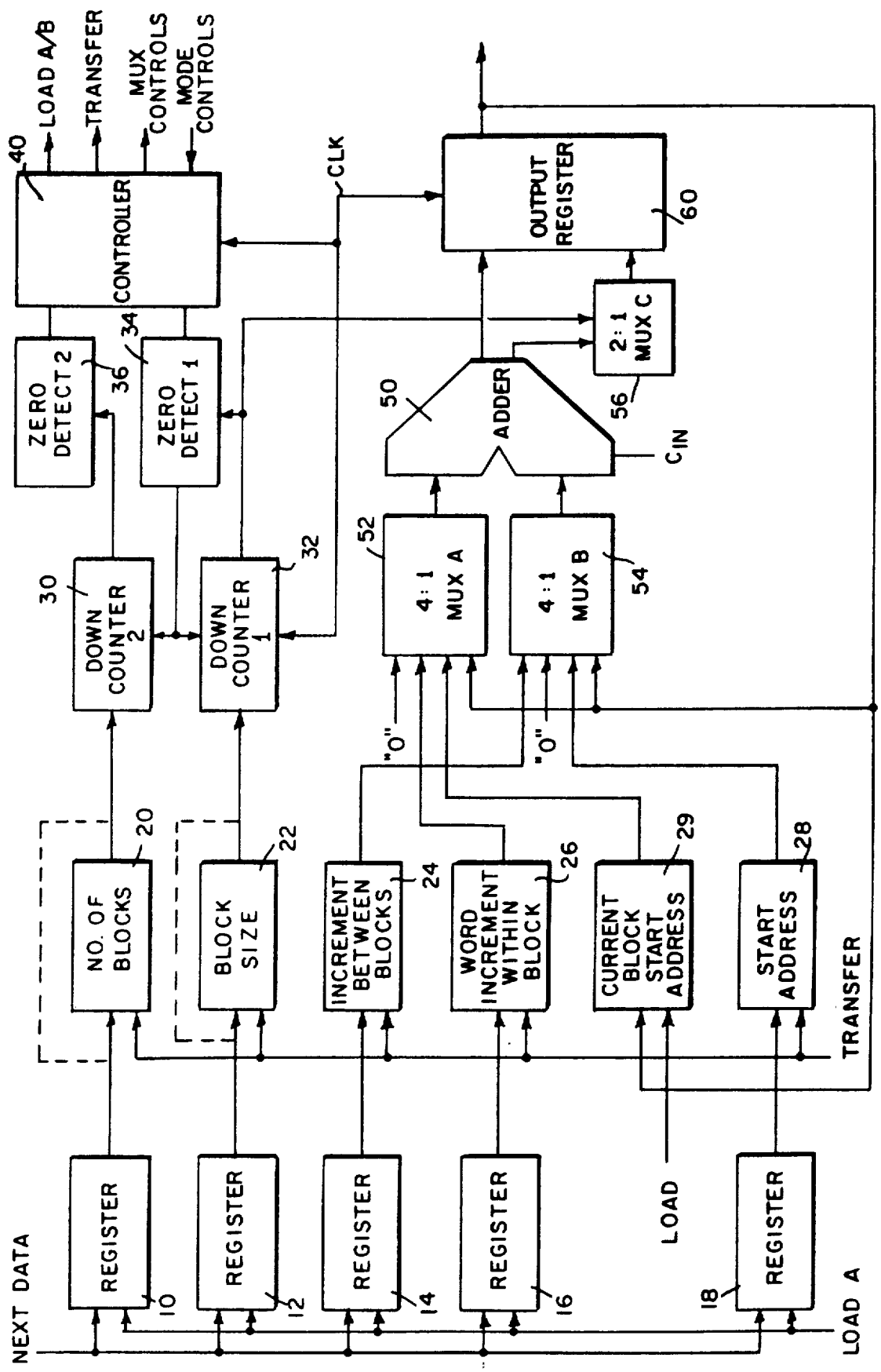

DIGITAL SIGNAL PROCESSING ADDRESS SEQUENCER

BACKGROUND AND SUMMARY OF THE PRESENT INVENTION

The present invention relates generally to address sequencers and more specifically to a Digital Signal Processing (DSP) address sequencer.

In Digital Signal Processing, there exist a need to generate an address to memories in various sequences. The sequences consist of: a) starting address, b) number of words in a block of addresses, c) number of blocks of addresses, d) increment between address blocks, and e) increments between addresses within a block. This assumes that all address blocks are uniform in length and uniformally distributed within a memory. This is generally the case. It is also desirable to set up a different sequence while the current sequence is being processed. Finally, it is desirable to make the structure capable of being tested without any additionally circuitry.

The prior art sequencers generally were microcoded sequencers or used various counters with fixed increment ratios or counts to determine when the next counter is to be incremented. An example is a maskable modulo counter PDSP1640 from Plessey Semiconductor.

Thus, it is object of the present invention to provide a more versatile address sequencer.

Another object of the present invention is to provide a sequencer which is not dependent upon fixed increments or counts.

Still a further object of the present invention is to provide an address sequencer which requires no additional circuitry for testing.

An even further object of the present invention is to provide a sequencer which is capable of setting up a different sequence while the current sequence is being processed.

These and other objects are obtained by providing an input structure for receiving and retaining sequential data which includes the sequence starting address, the number of blocks in the sequence, the number of words in a block, increment between blocks and increment between words, includes an adder connected between the input structure and an output device and includes a controller for selectively providing to the adder's inputs one or more of the sequence starting address, increment between words, increment between blocks and the output of the output device as a function of the number of blocks in the sequence and the number of words in a block. The controller begins a sequence by providing the sequence starting address to the adder. Subsequently the output of the output device and the increment between words in a block is provided to the adder for a plurality of cycles until the number of words within a block has been exceeded and then the increment between blocks and an address of the current block is provided to the adder. The previous two steps are repeated for plurality of cycles until the number of blocks of the sequence has been provided. An address of the current block to which the increment between blocks is to be added may be the last address of the block, which is available from the output device, or may be the starting address of the current block which is stored in a device at the beginning device of the cycle for the sequence for that block.

A first counter is provided for counting the number of cycles and a second counter for counting the number of blocks. The controller monitors the first counter to determine and reset it when the block size has been met and increments the second counter. Preferably the first and second counters are down counters and zero detectors are provided to produce the appropriate sequence and control. The sequence data is provided to input registers which are transferred to storage devices. This allows the information for more than one sequence to be stored and used. A pair of multiplexers are provided at the input of the adder such that the two inputs may be selectively produced. The output of the adder is connected directly to the output device, which is an output register, and may also be provided to a multiplexer which has a second input from the block size counter. This allows the output device to provide two independent addresses simultaneously for each cycle of operation.

Other objects, advantages and novel features of the present invention will become apparent from the following detailed description of the invention when considered in conjunction with the accompanying drawings.

BRIEF DESCRIPTION OF THE DRAWINGS

The FIGURE shows a block diagram of an address sequencer incorporating the principles of the present invention.

DETAILED DESCRIPTION OF THE DRAWINGS

As illustrated in the FIGURE, the input data is provided to input storage devices or registers 10, 12, 14 16, and 18. The input information includes the number of blocks loaded in register 10, the block size in register 12, the increment between blocks provided in register 14, the increment between words in a block in register 16 and the starting address of the sequence in register 18. The information and the input registers 10-18 are transferred into storage devices 20-28. Thus, the input registers 10-18 can store the next sequence information while the present information is stored in storage devices 20-28, which may also be registers. Each of the input registers 10-18 include a LOAD A control which clocks in the input data into the input registers. The storage devices 20-28 include a TRANSFER control which transfers the information from the input registers 10-18 into respective storage element 20-28. A current block start address is loaded into storage device 29 and, as will be explained below, it receives its input from the output of output device of register 60 and is under the control of the LOAD B signal.

A counter 30 is connected to the output of the number of blocks storage device 20 and the counter 32 is connected to the output of the block size storage device 22. The counters 30 and 32 are down counters and receive appropriate information from their respective storage devices. A zero detector 34 is connected to the output of the down counter 32 and detects when it has reached zero, indicating that a single block size has been provided and thereby provides an input to the down counter 30 to decrement the value of the number of blocks stored in the down counter 30. Zero detector 36 detects when the down counter 30 reaches zero indicating that the total number of blocks and thus the sequence has been exceeded. Zero detector 34 and 36 also provides inputs to controller 40. The controller 40 provides at its output the LOAD A signal to the input registers 10-18 and the LOAD B signal to the current block start address storage device 29. It also provides the TRANSFER signal to the storage elements 20-28. The controller 40 also provides multiplexer controls to the multiplexer 52, 54 and 56 as well as mode controls. The down counter 32 is driven by the clock signal as is the controller 40. The controller may have external inputs such a Start, Halt, Mode etc. Modes such as: single shot (one sequence and halt); single shot with automatic reload; and continuous mode where the block count is ignored could be provided. Mode control could be used to control the carry-in to the adder during test sequences or as part of the 52, 54, 56 multiplexer controls.

An adder 50 receives two inputs from multiplexers 52 and 54 and provides the output directly to the output device 60, illustrated as a register. A second input to the output register 60 is from the multiplexer 56 which has an input from the output of the adder 50 as well as the output of the down counter 32 which has the block size. The multiplexers 52 and 54 select the appropriate inputs to the adder 50 to produce the desired sequence. Each of the multiplexers 52 and 54 has an input from the output register 60 and a zero input. Multiplexer 52 also has an input from the current block start address storage device 29 and from the word increment within block storage device 26. The multiplexer 54 includes additional input from the start address storage device 28 and the increment between blocks storage device 24.

As will be discussed below the specific information or data provided to the multiplexers 52 and 54 are an illustration of one specific implementation. The importance is that the adder receives two inputs which produce a sequence and not that a specific multiplexer has specific inputs. The output register 60 also receives an input from the clock to load the output of the adder and the output from multiplexer 56 in each clock cycle.

The operation of the sequencer and the relationship of the elements will be clear from the following description of the sequence. In the initial cycle, the sequence data, including the number of blocks in a sequence, the block size, the increment between blocks, the word increment within the block and the starting address are loaded into the input registers 10-18 by the LOAD A signal. This is followed by transferring the new data to the storage elements 20-28 by the TRANSFER signal. As indicated by the dotted lines, the number of blocks and the block size is also transferred directly to the down counters 30 and 32 respectively. In the initial cycle, multiplexer 52 is controlled to select the zero input and multiplexer 54 is controlled to select the start address from storage device 28. Thus, the output of the adder 50 in the initial cycle is the start address.

For the first clock cycle, the output of the adder 50, namely the start addresses, is clocked into the output register 60. Also the down counter 32 is decremented decreasing the block size. In response to the clock pulse, the controller 40 changes multiplexer 52 to provide as its output to the adder 50 the word increment within the block value from storage 26 and changes multiplexer 54 to provide to the adder 50 the output of the output register 60.

During the second clock cycle, the second address at the output of the adder 50 is provided to the output register 60 and the down counter 32 is decremented again. Between the first and second clock pulses, the controller 40 provides a LOAD B signal to load the first address at the output of output register 60 into the current block start address storage device 29.

This cycle is repeated with the multiplexer 52 and 54 providing the word increment within the block and the current address from the output register to the adder 50 respectively until the down counter 32 reaches zero indicating the end of the block. The zero detector 34 indicates the end of the block to the controller 34 and decrements the count in down counter 30 to decrease the number of blocks in the sequence. Upon receiving the signal from the zero detector 34, the controller 40 changes multiplexer 52 to provide the current block start address 29 to the adder 50 and changes multiplexer 54 to provide the increment between block data 24 to the adder 50. The down counter 32 is again loaded from the block size storage device 22.

On the next clock cycle, the new starting address of the new block is loaded into the output register 60 and down counter is decremented. The controller 40 then changes the multiplexer 52 to provide as an input to the adder 50, the word increment within a block value and changes multiplexer 54 to provide the output of the output register 60 as input to adder 50 and also loads the beginning address of the present block start address into storage device 29 from the output register 60.

The sequence is then repeated until the down counter 32 is again reaches zero as determined by zero detector 34. At this point, the down counter 32 is decremented and the end of a block cycle described above is repeated by loading the current block start address 29 into the adder 50 to be combined with the increment between blocks from storage device 24 as described above. The sequence is then repeated until the down counter 30 reaches zero indicating that all the blocks and all the words within the blocks have been addressed. At this point, the controller 40 may repeat the sequence or start a new sequence. To start a new sequence, the data from the next sequence which is on input registers 10-18 is transferred to the storage devices 20-28 and the third sequence information may be loaded into the input registers 10-18.

In certain situations, it may be desirable to provide two separate and independent addresses on the output of the output register 60. For example, if the present device has been designed such that counter 32 is 12 bits and the output of the adder 50 is 24 bits, the output register 50 would be a 24-bit register. Thus, in any clock cycle using the multiplexer 56, the output of the adder 50 may be provided in the output register 60 or the least significant 12 bits output of the adder 50 and output of the down counter 32 may be simultaneously provided at the output of the output register 60. Both these addresses are available during a single clock cycle without any additional circuitry other than the multiplexer 56. This is helpful in not only providing unique addresses but it is also very helpful in testing and to produce testing sequences.

Alternatively the adder could be configured as several (two) cascaded adders with the carry-out from one selectively providing the carry-in to the next adder. The mode control could provide the inhibiting of the carry-out to carry-in, thus providing several independent sequences.

It will noted that in the above-sequenced description, the output from the output register 60 was only provided to multiplexer 54 and its connection to multiplexer 52 is not discussed. One possible use of providing the output of output register 62 to both multiplexers 52 and 54 is to provide a unique sequence where the output is added to itself in adder 50. This will produce an exponential effect. Thus, for the starting address of 1, it would become 1, 2, 4, 8, 16, etc., as illustrated in Table I.

TABLE I

| |
|---|
| 00001 |
| 00010 |
| 00100 |
| 01000 |
| 10000 |

It should be noted that the adder 50 has a carry-in input Cin and this sequence is produced with a carry-in of zero.

Another unique sequence can be produced using the output of the output register 60 to both the multiplexers 52 and 54, adder 50 using a carry-in of 1 and an initial pattern of 11110. During the initial sequence, the carry-in sequence is set to zero such that the output register has a value of 11110, during subsequent sequences, the carry-in is set to 1 to produce the pattern illustrated in Table II.

TABLE II

| |
|---|
| 11110 |
| 11101 |
| 11011 |
| 10111 |
| 01111 |

A third possible pattern can be produced wherein both the outputs of the output register 60 is provided as two inputs to the adder 50, uses an alternating carry-in of 1's and zero's and an initial pattern of 1010. The carry-in begins with zero and alternates to a 1 and produces the pattern of Table III.

TABLE III

| |
|---|
| 10101 |
| 01010 |
| 10101 |
| 01010 |

Thus, it can been seen from Table I that a pattern can be produced which appears as a 1 shifting through a field of zeros, as illustrated in Table II as a zero shifting through a field of 1's or as shown by Table III a checker board pattern. These patterns are useful for memory data storage testing.

To increment between blocks, the FIGURE provides a current block start address in storage device 29. Thus, the increment between blocks provided to register 14 and storage device 24 is the difference between the starting address of a block and a starter address of the next block. The current block start address storage device 29 may be omitted and the increment between blocks data would then be the difference between the last address of a block and the starting address of the next block. This is a modification of the FIGURE not illustrated.

It should also be noted that the connection of the specific storage devices 24, 26, 28 and 29 to the multiplexers 52 and 54 can be modified as long as specific relationships are maintained. More specifically, the increment between block storage device 24 should be connected to a different multiplexer than the current block start address storage device 29. Thus, the connection illustrated in the FIGURE may be reversed with the increment between blocks storage device 24 being connected to multiplexer at 52 and the current block start address storage device may be connected to multiplexer 54. Similarly it is important that the word increment within block storage device 26 be connected to a different multiplexer than the output of the output register 60 since they are used to increment each other. It is not as important that the start address storage device 28 be connected to a specific multiplexer as long as the other multiplexer has an input of zero.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An address sequencer comprising:
   output means for providing an output address;
   data input means for receiving and storing sequence data including sequence starting address, number of blocks in the sequence, number of words in a block, increment between blocks and increment between words in a block;
   control input means for receiving controls determining the sequence to be generated from and defined by said sequence data;
   adder means having an output connected to said output means and a first and a second input for providing a sum at its output of values on said first and second inputs;
   selector means interconnecting said data input means and output means to said adder means for selectively providing to said adder means first and second inputs one or more of said sequence starting address, said increment between words, said increment between blocks and the output means' output; and
   controller means connected to said data and control input means, selector means, output means and adder means for determining the inputs selected by said selector means for one or more cycles as determined by said controls and defined by said number of blocks in said sequence and number of words in a block, to produce a sequence of addresses by incrementing said starting address and said output means' output with said increment between words and increment between blocks.

2. An address sequencer according to claim 1, wherein said controller means include sequence means for controlling said selector means to a) begin a sequence by providing said sequence starting address to said adder means, b) subsequently providing output of said output means and said increment between words in a block for a plurality of cycles to said adder means until the number of words within a block has been provided, c) subsequently providing said increment between blocks and an address of a current block to said adder means, and d) repeating steps b and c for a plurality of cycles until the number of blocks in the sequence has been exceeded.

3. An address sequencer according to claim 1, wherein said controller means include first storage means for storing a current block's starting address, said selector means interconnects said first storage means to said adder means and said controller means selectively connects said outputs means output to said first storage means and one of said adder means inputs to said first storage means.

4. An address sequencer according to claim 3, wherein said controller means include sequence means for controlling said selector means to a) begin a sequence by providing said sequence starting address to said adder means, b) subsequently providing output of said output means and said increment between words in a block for a plurality of cycles to said adder means until the number of words within a block has been provided, c) subsequently providing said increment between blocks and current block's starting address to said adder means, and d) repeating steps b and c for a plurality of cycles until the number of blocks in the sequence has been exceeded.

5. An address sequencer according to claim 3, wherein said controller means includes a first counter means for counting a number of cycles and second counter means for counting the number of blocks and said controller means monitors said first and second counter means.

6. An address sequencer according to claim 5, wherein said controller means reloads said first counter and changes said second counter means when said first counter has counted said first counter means a number of cycles equal to said number of words in a block.

7. An address sequencer according to claim 3, wherein said selector means includes:
first and second multiplex means each having an output connected respectively to said adder means first and second inputs;
said output of said output means is connected to an input of one of said multiplexer means and said increment between words in a block is applied to an input of the other of said multiplexer means;
said sequence starting address is applied to an input of one of said multiplexer means and a zero is applied to an input of the other said multiplexer means;
said current block's starting address is applied to an input of one of said multiplexer means and said increment between blocks is applied to the other of said multiplexer means.

8. An address sequencer according to claim 7, wherein said other multiplexer means input also receives a zero input.

9. An address sequencer according to claim 7, wherein said controller means includes a first counter means for counting the number of cycles within a block and second counter means for counting the number of blocks and said controller means monitors said first and second counter means.

10. An address sequencer according to claim 9, wherein said controller means reloads said first counter and changes said second counter means when said first counter has counted said first counter means a number of cycles equal to said number of words in a block.

11. An address sequencer according to claim 10, wherein said first and second counter means are down counter which are initialized with said number of words in a block and number of blocks in a sequence respectively and are decremented by said controller means.

12. An address sequencer according to claim 11, wherein said controller means includes a first zero detector means for detecting a zero content of said first counter means and said first zero detector decrements said second counter means when a zero is detected.

13. An address sequencer according to claim 12, wherein said controller means includes a second zero detector means for detecting a zero content of said second counter means and said controller means allows said input means to receive new sequence data when said second zero detector means detects a zero.

14. An address sequencer according to claim 1, wherein said output means is an output storage means which is updated each cycle.

15. An address sequencer according to claim 1, wherein said selector means includes:
first and second multiplex means each having an output connected respectively to said adder means first and second inputs;
said output of said output means is connected to an input of one of said multiplexer means and said increment between words in a block is applied to an input of the other of said multiplexer means;
said sequence starting address is applied to an input of one of said multiplexer means and a zero is applied to an input of the other said multiplexer means;
an address of the current block is applied to an input of one of said multiplexer means and said increment between blocks is applied to the other of said multiplexer means.

16. An address sequencer according to claim 15, wherein said controller means includes means for storing the starting address of the current block and providing the starting address of the current block as said address of the current block to said one of the said multiplexer means.

17. An address sequencer according to claim 15, wherein said output of said output means is provided as said address of the current block to said one of said multiplexer means.

18. An address sequencer according to claim 1, wherein said input means includes first input storage means for storing said sequence data.

19. An address sequencer according to claim 18, wherein said input means include second input storage means for storing sequence data of a current sequence and said first input storage means stores sequence data of a next sequence.

20. An address sequencer according to claim 19, wherein said controller means transfers said sequence data from said first input storage means to said second input storage means at the beginning of a sequence.

21. An address sequencer according to claim 1, wherein said controller means includes counter means for counting cycles and a multiplexer means having an output connected to said output means and having inputs receiving the output of said adder means and counter means, and
said controller means selects which input of said multiplexer means is provided to said output means.

22. An address sequencer according to claim 21, wherein said selector means selectively provides output of said output means to both inputs of said adder means.

23. An address sequencer according to claim 21, wherein said adder mean's output is also connected directly to said output means.

24. An address sequencer according to claim 1, wherein said selector means selectively provides output of said output means to both inputs of said adder means.

25. An address sequencer according to claim 24, wherein said control means includes carry-in means for selectively applying a zero or a one carry-in to said adder means.

26. An address sequencer comprising:

input means for receiving sequence data including sequence starting address, number of blocks in the sequence, number of words in a block, increment between blocks and increment between words in a block;

adder means having an output and having a first and a second input for providing a sum at its output of values on said first and second inputs;

counter means for counting cycles;

output means, having an address bit capacity equal to a bit capacity of said adder means, for providing an output address;

multiplexer means having an output connected to said output means and having inputs receiving the output of said adder means and said counter means;

a portion of said address bits from said adder means being connected directly to said output means and the remainder are connected to said multiplexer means; and controller means connected to said input means, adder means, multiplexer means and said output means, for a) selectively providing to said adder means first and second inputs one or more of said sequence starting address, said increment between words, said increment between blocks and the output means' output, as determined by said number of blocks in said sequence and number of words in a block to produce a sequence of addresses, by incrementing said starting address and said output means' output with said increment between words and increment between blocks, and b) selecting which input of said multiplexer means is provided to said output means whereby said output means provides either the complete output of said adder means or two separate outputs including said portion of said adder bits and bits of said counter means.

* * * * *